United States Patent [19]

Enami et al.

[11] Patent Number: 4,870,514
[45] Date of Patent: Sep. 26, 1989

[54] DISK DRIVE CIRCUIT ARRANGEMENT FOR THE SUPPRESSION OF UNDESIRED INDEX PULSES

[75] Inventors: Katsuya Enami, Houya, Tokyo; Hiroshi Tsuyuguchi, Tokyo, both of Japan

[73] Assignee: Teac Corporation, Tokyo, Japan

[21] Appl. No.: 134,219

[22] Filed: Dec. 16, 1987

[30] Foreign Application Priority Data

Dec. 30, 1986 [JP] Japan .................................. 61-311431

[51] Int. Cl.⁴ ........................ G11B 15/12; G11B 15/18
[52] U.S. Cl. ...................................... 360/61; 360/72.1
[58] Field of Search ................ 360/61, 60, 72.1, 72.2, 360/53, 67, 46

[56] References Cited

U.S. PATENT DOCUMENTS 4,583,133  4/1986  Sjohi et al. ........................... 360/69
4,658,133  4/1987  Tsuyuguchi et al. ................. 360/69

*Primary Examiner*—Vincent P. Canney
*Attorney, Agent, or Firm*—Woodcock Washburn Kurtz Mackiewicz & Norris

[57] ABSTRACT

A flexible magnetic disk drive has an index sensor which, during the rotation of the magnetic disk, generates a series of index pulses representative of the angular position of the magnetic disk. The index pulses are delivered to a host system only when a drive select signal supplied therefrom to the disk drive is in a prescribed state dictating the execution of reading or writing by that disk drive. Since the host system responds to the leading edges of the incoming index pulses for formatting the magnetic disk, any index pulse should be suppressed if the drive select signal assumes the prescribed state during the duration of that index pulse; otherwise, the leading edge of the index pulse would erroneously represents the angular position of the magnetic disk. Thus the disk drive circuitry is improved, typically by incorporating a flip-flop circuit, for suppressing the undesired index pulse and for permitting the delivery of the subsequently generated index pulses as long as the drive select signal remains in the prescribed state.

5 Claims, 3 Drawing Sheets (A) INDEX PULSE
(B) DRIVE SELECT SIGNAL
(C) INVERTED DRIVE SELECT SIGNAL
(D) OUTPUT FROM NAND 86
(E) OUTPUT FROM FLIP-FLOP 66a
(F) INDEX PULSE FED TO HOST

DISK DRIVE CIRCUIT ARRANGEMENT FOR THE SUPPRESSION OF UNDESIRED INDEX PULSES

BACKGROUND OF THE INVENTION

Our invention relates generally to apparatus for data transfer with record media such as flexible magnetic disks, and particularly to a disk drive operating under the control of a host system. More particularly, our invention deals with improvements in the electronic circuitry of a disk drive for the prevention of the undesirable delivery of index pulses to the host system.

The flexible magnetic disk drive of standard construction is not self-contained; it is a slave unit operating under the control of a master, known as a host system, typically comprising a central processor unit (CPU) and a disk drive controller. Also, as disclosed in Shoji et al. U.S. Pat. Nos. 4,583,133 and Tsuyuguchi et al. 4,658,307, two or more disk drives may be interfaced with one host system for independent operation under its control. Each disk drive reads or writes on the associated magnetic disk only when so dictated by a drive select signal fed from the host system. It is also the common practice in the disk drive art to generate in each disk drive a series of index pulses indicative of the angular position and speed of rotation of the magnetic disk and to deliver the index pulses to the host system only when the drive select signal dictates the execution of reading or writing in that disk drive. The host system relies on the index pulses for controlling the various aspects of data transfer operation in the disk drive.

In each disk drive the index pulses may be generated by optically sensing an index hole formed in the magnetic disk in an eccentric position thereon, as is common with disk drives for use with magnetic disks having standardized diameters of 3, 5.25 or 8 inches. Alternatively, in disk drives for use with 3.5-inch magnetic disks, the index pulses may be generated by magnetoelectrically or photoelectrically detecting a permanent magnet or a piece of reflective sheet affixed to a part rotatable with the magnetic disk, for example, the outer rotor of the disk drive motor. Reference may be had to Castrodale et al. U.S. Pat. No. 4,089,029 for more details on the photoelectric detection of the index hole in the magnetic disk, and to Shoji et al. U.S. Pat. No. 4,629,942 for more details on the magnetoelectric or photoelectric detection of index marks on the parts rotatable with the disk.

As far as we are aware, there has been a problem left unsolved in connection with the delivery of the index pulses from the disk drive to the host system in response to the drive select signal. Let us assume that the drive select signal as supplied from the host system is normally high and goes low to command the executive of data transfer in the disk drive. The problem arises as the drive select signal may go low at any moment, with no time relation whatever to the index pulses. Admittedly, even in the prior art data transfer system, no inconveniences have been encountered in cases where the drive select signal goes low during the time intervals between the successive index pulses. The problem does, however, occur when the drive select signal goes low during the duration of any index pulse, as discussed in further detail hereafter.

The known configuration of the disk drive circuitry has been such that the index pulses and the drive select signal are fed more or less directly to a logic gate. When the drive select signal is high, not commanding the operation of the disk drive, the gate inhibits the delivery of the index pulses to the host system. Suppose that the drive select signal goes low during the duration of an index pulse. This index pulse will have only its leading edge portion cut off and will be permitted to go into the host system in the form of a reduced duration pulse. The leading edge of this reduced duration pulse does not correctly represents the angular position of the magnetic disk. This is undesirable because the host system relies on the leading edges of the incoming index pulses for disk formatting and other disk control functions. We will later discuss the problem in more detail in the course of the disclosure of a preferred embodiment of our invention.

SUMMARY OF THE INVENTION

We have hereby invented how to prevent the delivery of such incorrect index pulses from the disk drive to the host system without any major alteration of the existing circuitry of the complete data transfer system.

Briefly, our invention may be summarized as an apparatus for data transfer with a disklike record medium such as a flexible magnetic disk under the control of a host system, comprising signal input means for inputting from the host system a drive select signal having a first prescribed state dictating the execution of data transfer between the record medium and the transducer, and a second prescribed state not dictating the execution of data transfer therebetween. Index sensor means generate a series of index pulses indicative of the angular position of the record medium during the rotation of the latter, the index pulses being for delivery to the host system in order to enable the same to control the apparatus in response to the incoming index pulses when the drive select signal is in the first prescribed state. Connected to both the signal input means and the index sensor means are circuit means for inhibiting the delivery to the host system of any index pulse when the drive select signal changes from the second to the first prescribed state substantially during the duration of that index pulse, the circuit means permitting the delivery to the host system of the subsequently supplied index pulses as long as the drive select signal remains in the first prescribed state, thereby enabling the host system to respond correctly to the leading edges of the incoming index pulses.

All that is needed for the practice of our invention is to incorporate an additional circuit component such as, for example, a D flip flop in the existing circuitry of the disk drive.

The above and other features and advantages of our invention and the manner or realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
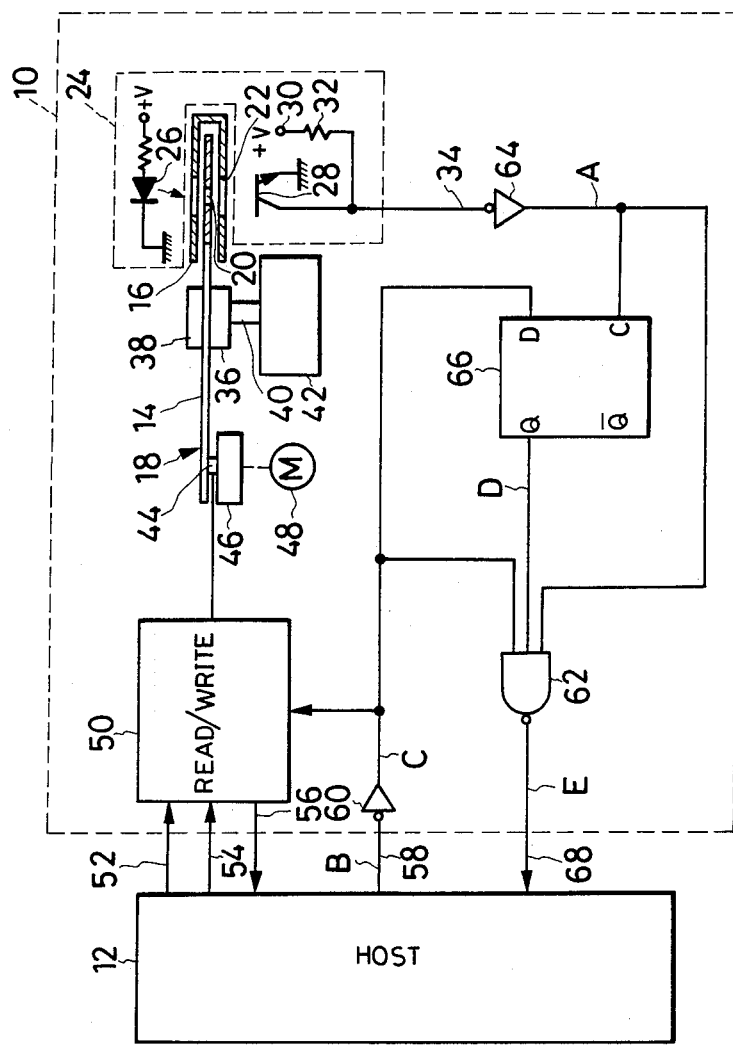
FIG. 1 is a schematic electrical diagram of the disk drive constructed in accordance with our invention, the disk drive being shown together with the host system.

We will now describe our invention in detail as embodied in a disk drive for use with a single-sided, 5.25-inch flexible magnetic disk. In FIG. 1 the disk drive is shown enclosed in the dashed outline and generally designated 10. The disk drive 10 is conventionally interfaced with a host system 12 for operation under its control. The host system 12 can be of any known or suitable design comprising a central processor unit and a disk drive controller, both not shown, which are available commercially.

Although we have shown the disk drive 10 highly diagrammatically, it will nevertheless be seen that the drive drive has the 5.25-inch magnetic disk 14 loaded in a preassigned data transfer position therein. The magnetic disk 14 is rotatably housed in a protective envelope or jacket 16, shown fragmentarily, to make up a disk cartridge 18. As is standard in the art, the magnetic disk 14 has an index hole 20 formed in an eccentric position thereon. The envelope 16 also has a hole 22 defined therethrough. With the rotation of the magnetic disk 14 relative to the envelope 16, the index hole 20 in the former comes into and out of register with the hole 22 in the envelope.

The disk drive 10 is conventionally furnished with a photoelectric index sensor 24 for producing electric index pulses representative of the angular position, as well as the speed of rotation, of the magnetic disk 14. The index sensor 24 comprises a light source 26 such as a light-emitting diode disposed on one side of the disk cartridge 18, and a photodetector 28 such as a phototransistor disposed on the other side of the disk cartridge. The light source 26 and the photodetector 28 are positioned opposite each other through the hole 22 in the disk envelope 16. Therefore, each time the index hole 20 in the magnetic disk 14 comes into register with the envelope hole 22, the radiant energy emitted by the light source 26 impinges on the photodetector 28 through the aligned holes 20 and 22.

The phototransistor herein employed as the photodetector 28 has its emitter grounded and its collector connected to a positive supply terminal 30 via a resistor 32. The output line 34 of the index sensor 24 is therefore normally high. The output line 34 will go low only when the phototransistor 28 is irradiated by the light source 26 via the aligned index hole 20 and envelope hole 22 during the rotation of the magnetic disk 14.

At 36 in FIG. 1 is shown a turntable against which the central portion of the magnetic disk 14, exposed through apertures in the envelope 16, is engaged by a clamp 38. This clamp is rotatably carried by a swing arm, not shown, thereby to be moved into and out of clamping engagement wit the turntable 36 via the magnetic disk 14. The turntable 36 is mounted fast on an upstanding spindle 40 which in fact is the armature shaft of a disk drive motor 42. Accordingly, engaged between turntable 36 and clamp 38, the magnetic disk 14 is rotatable with the disk drive motor 42.

A magnetic transducer 44 such as a read/write head is shown disposed on the underside of the magnetic disk 14 for data transfer (reading and/or writing) contact therewith. The transducer 44 is mounted on a carriage 46 thereby to be transported radially of the magnetic disk 14 for accessing the concentric data storage tracks thereon. A transducer positioning mechanism comprising a stepper motor 48 and a motion translating mechanism, not shown, is coupled to the carriage 46 for positioning the transducer 44 on any desired track on the magnetic disk.

The transducer 44 is electrically connected to a read/write circuit 50 of conventional configuration. As is well known, in the data transfer system of this type, the read/write circuit 50 of the disk drive 10 is electrically connected to the host system 12 via a WRITE DATA line 52, WRITE GATE line 54 and READ DATA line 56. The read/write circuit 50 modulates the write data fed over the WRITE DATA line 52 into a signal to be written on the magnetic disk 14 by the transducer 44. Further, as the transducer 44 reads the magnetic disk 14 and supplies an electric signal, the read/write circuit 50 converts it into read data that can be fed to the host system 12 over the READ DATA line 56.

Also connected to the read/write circuit 50 is a DRIVE SELECT line 58 having a NOT circuit 60. The read/write circuit 50 includes a gate circuit, not shown, which permits the transmission of the read and/or write data or of equivalent signals when the drive select signal dictates reading and/or writing.

The index sensor 24 has its output connected to one of the three inputs of a NAND gate 62 via a NOT circuit 64 having a waveform shaping function. The two other inputs of the NAND gate 62 is connected respectively to the DRIVE SELECT line 58 via the NOT circuit 60 and to a Q output of a D flip-flop circuit 66 constituting a feature of our invention. The output of the NAND gate 62 is connected to the host system 12 via an INDEX line 68. It will therefore be seen that, unlike the case heretofore, the index signal is not fed directly from the index sensor 24 to the host system 12 but via the NAND gate 62 which functions to suppress index pulses as required in accordance with the novel concepts of our invention.

The D flip-flop circuit 66 serves the purpose of discriminating whether, at the moment of the leading edge of each incoming index pulse, the drive select signal is in a state dictating the reading and/or writing operation of the disk drive 10. For such discrimination the D flip-flop circuit 66 has its data input D connected to the DRIVE SELECT line 58 via the NOT circuit 60, and its clock input C connected to the index sensor 24 via the NOT circuit 64.

Operation

Figure 2:
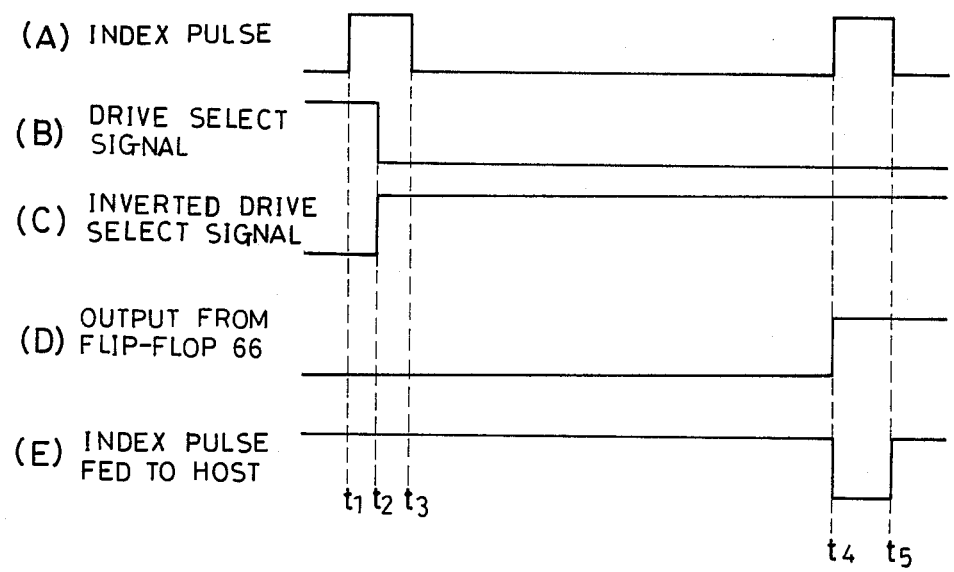
FIG. 2A through E is a waveform diagram of various signals, shown in time relation to each other, useful in explaining the operation of the FIG. 1 system.

During the following discussion of operation of the FIG. 1 embodiment we will refer also to the waveform diagram of FIG. 2, which shows the signals appearing in the various parts of the FIG. 1 system. I have indicated in FIG. 1 the parts where the signals (A) through (E) of FIG. 2 appear, by the same capitals.

As the disk drive motor 42 is set into rotation with the magnetic disk 14, the index sensor 24 will put out a "negative" index pulse with each rotation of the magnetic disk, as from moment t1 to moment t3, from moment t4 to moment t5, etc., in FIG. 2. Such "negative" index pulses will be inverted by the NOT circuit 64 into "positive" index pulses shown at (A) in FIG. 2. Hereinafter in this specification we will use the term "index pulses" or "index signal" to mean the "positive" pulses issuing from the NOT circuit 64.

As indicated at (B) in FIG. 2, the drive select signal fed from the host system 12 over the line 58 has a first or low state dictating the execution of the read and/or write operation of the disk drive 10, and a second or high state not dictating the execution of such operation. The NOT circuit 60 inverts this drive select signal into the form shown at (C) in FIG. 2, prior to delivery to the read/write circuit 60, NAND gate 62 and D flip-flop circuit 66. Let us suppose that the drive select signal changes from its high to low state at a moment t2, intermediate the moments t1 and t3 during which an index pulse appears. Clocked by the leading edge of that index pulse at the moment t1, the D flip-flop circuit 66 will latch the low state of the inverted drive select signal (C), so that its Q output will remain low as at (D) in FIG. 2. That is to say that the D flip-flop circuit 66 does not respond to the change of the drive select signal from its high to low state, if that change takes place during the appearance of an index pulse.

Figure 3:
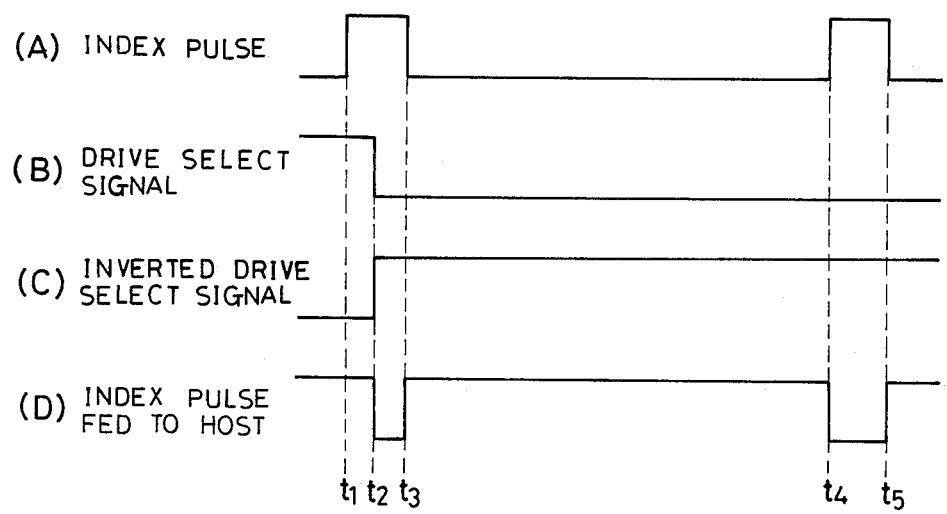
FIG. 3A through d is a similar waveform diagram explanatory of the noted problem encountered with the prior art.

Such complete suppression of the index pulse is in contrast to the prior art wherein the D flip-flop circuit 66 is absent. FIG. 3 is a waveform diagram similar to FIG. 2 but explanatory of what has happened heretofore if the drive select signal goes low during the appearance of an index pulse. Because of the absence of the flip-flop circuit 66 this index pulse is not suppressed but is allowed to go to the host system 12 in the form of a "negative" pulse of reduced duration depicted at (D) in FIG. 3. We have already stated the resulting inconveniences encountered hitherto.

With reference back to FIGS. 1 and 2 the Q output from the D flip-flop circuit 66 is low from moment t2 to moment t3. Accordingly, the NAND gate 62 will remain high as at (E) in FIG. 2, even though the index signal and the inverted drive select signal, the other two inputs to the NAND gate, are both high during that time interval. No "negative" index pulse of reduced duration will thus be delivered to the host system 12, so that there is no danger of the host system erroneously responding to such a reduced duration pulse.

Upon appearance of the next index pulse at a moment t4, as at (A) in FIG. 2, the D flip-flop circuit 66 will respond to the high state of the inverted drive select signal, with its Q output going high at that moment as at (D) in FIG. 2. All the three inputs to the NAND gate 62 will thus be high from moment t4 to moment t5, the latter being the moment the second index pulse disappears. The resulting "negative" output pulse of the NAND gate 62, representing the valid index pulse from the NOT circuit 64, will be fed to the host system 12. The host system will, for example, format the magnetic disk 14 in response to the leading edge of this valid incoming pulse.

Alternative Form

Figure 4:
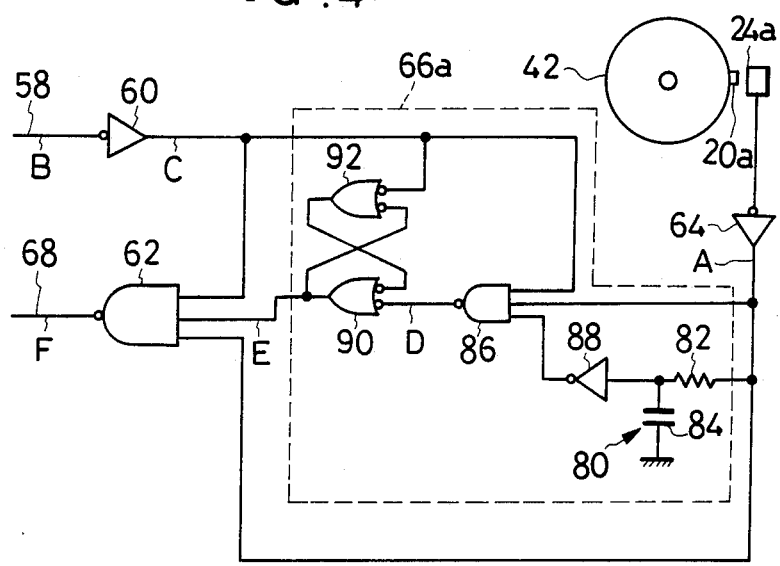
FIG. 4 is a partial schematic electrical diagram of a slight modification of the disk drive circuitry of FIG. 1.

FIG. 4 shows an alternative embodiment of our invention which employs a different method of generating the index signal, and a different type of flip-flop in substitution for the D flip-flop circuit 66 of the FIG. 1 embodiment. We have shown at (A) through (F) in FIG. 4 the signals appearing in those parts of the FIG. 4 circuitry which are designated by the same capitals.

For generating the index signal, we have adopted in this alternative embodiment a magnetoelectric index sensor 24a such as a Hall effect device responsive to a piece of permanent magnet 20a arranged eccentrically on the outer rotor of the disk drive motor 42, instead of the photoelectric index sensor 24 for detecting the eccentric index hole in the magnetic disk as in the FIG. 1 embodiment. The magnetoelectric index sensor 24a is fixed in a prescribed position in relation to the angular position of the permanent magnet 20a on the disk drive motor 42. Connectd to the magnetoelectric index sensor 24a, the NOT circuit 64 provides a series of index pulses, shown at (A) in FIG. 5, just as in the FIG. 1 embodiment. As has been set forth, this method of sensing the angular position and speed of rotation of the magnetic disk is not new but has been known and practiced in conjunction with the 3.5-inch disk drive. It is of course possible to replace the permanent magnet 20a on the disk drive motor 42 by a member having a reflective surface, to be sensed by an optical index sensor, as has also been known heretofore.

The FIG. 4 embodiment particularly features the discriminating circuit 66a having a time constant circuit 80 comprised of a resistor 82 and capacitor 84. The NOT circuit 64, whose input is connected to the index sensor 24a as aforesaid, has its output connected both to the time constant circuit 80 and to one of the three inputs of a NAND gate 86. The other two inputs of the NAND gate 86 are connected respectively to the time constant circuit 80 via a NOT circuit 88 and to the DRIVE SELECT output line 58 of the host system via the NOT circuit 60. The output of the NAND gate 86 is connected to one of the two inputs of a first OR type NAND gate 90, the other input of which is connected to the output of a second OR type NAND gate 92. This second NAND gate has two inputs connected respectively to the DRIVE SELECT output line 58 via the NOT circuit 60 and to output of the first OR type NAND gate 90. This output of the first OR type NAND gate 90 also constitutes that of the complete discriminating circuit 66a, being connected directly to one of the three inputs of the NAND gate 62.

Figure 5:
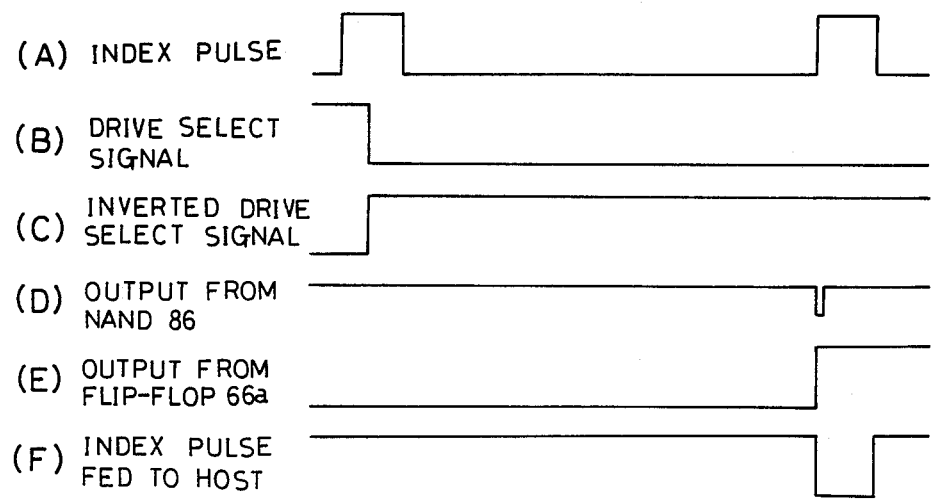
FIG. 5A through E is a waveform diagram similar to FIG. 2 but explanatory of the operation of the FIG. 4 embodiment.

As will be apparent from a study of FIG. 5, the output from the NAND gate 86 of the discriminating circuit 66a will remain high, as at (D) in FIG. 5, if the inverted drive select signal goes high during the appearance of any index pulse. Therefore, as indicated at (E) and (F) in FIG. 5, the output from the discriminating circuit 66a will remain low, causing the NAND gate 62 to suppress the index pulse. Upon appearance of the next index pulse the output from the NAND gate 86 will go low for a brief time, with the result that the output from the discriminating circuit 66a goes high to permit the NAND gate 62 to deliver a "negative" index pulse to the host system.

Despite the foregoing detailed disclosure we do not wish our invention to be limited by the exact details of the illustrated embodiments, since a variety of modifications or adaptations of such specific embodiments will readily occur to one skilled in the art. For instance, the disk drive circuitry of FIG. 1 or 4 may be modified so that if the drive select signal changes from one level to the other at the same moment with, or at a moment very shortly after, the moment of appearance of any index pulse, then this index pulse may not be suppressed. Thus, in FIG. 2, the first index pulse shown at (A) may not be suppressed if the difference between the moments t1 and t2 is negligibly small.

What we claims is:

1. An apparatus for data transfer with a disklike record medium such as a flexible magnetic disk under the control of a host system, comprising:

(a) drive means for imparting rotation to the record medium;

(b) a transducer for data transfer with the record medium;

(c) signal input means for inputting from the host system a drive select signal having a first prescribed state dictating the execution of data transfer between the record medium and the transducer, and a second prescribed state not dictating the execution of data transfer therebetween;

(d) a read/write circuit connected to the transducer and the signal input means for processing data transferred between the second medium and the transducer when the drive select signal is in the first prescribed state;

(e) index sensor means for generating a series of index pulses indicative of the angular position of the record medium during the rotation of the latter, the index pulses being for delivery to the host system in order to enable the same to control the apparatus in response to the incoming index pulses when the drive select signal is in the first prescribed state; and (f) circuit means connected to the signal input means and the index sensor means for inhibiting the delivery to the host system of any index pulse when the drive select signal changes from the second to the first prescribed state substantially during the duration of that index pulse, the circuit means permitting the delivery to the host system of the subsequently supplied index pulses as long as the drive select signal remains in the first prescribed state, thereby enabling the host system to respond correctly to the leading edges of the incoming index pulses.

2. The data transfer apparatus of claim 1 wherein the circuit means comprises:

(a) a gate circuit having a first input connected to the index sensor means and a second input connected to the signal input means for permitting the delivery of the index pulses to the host system when the drive select signal is in the first prescribed state; and (b) a bistable circuit having two inputs connected respectively to the index sensor means and to the signal supply means, and an output connected to a third input of the gate circuit, for causing the gate circuit to suppress an incoming index pulse if the drive select signal changes from the second to the first prescribed state during the duration of that index pulse.

3. The data transfer apparatus of claim 2 wherein the bistable circuit is a D flip-flop circuit.

4. The data transfer apparatus of claim 1 wherein the index sensor means comprises a photoelectric index sensor capable of sensing an index hole formed in the record medium.

5. The data transfer apparatus of claim 1 wherein the index sensor means comprises a index capable of sensing an index mark formed on a rotary part of the drive means.

* * * * *

UNITED STATES PATENT AND TRADEMARK OFFICE
CERTIFICATE OF CORRECTION

PATENT NO. : 4,870,514

DATED : September 26, 1989

INVENTOR(S) : Katsuya Enami et al

It is certified that error appears in the above-identified patent and that said Letters Patent is hereby corrected as shown below:

Title Page, Col. 2, 6th line from bottom, "represents" should be --represent--.

Col. 5, line 14, "60" should be --50--.

Signed and Sealed this

Sixth Day of October, 1992

*Attest:*

DOUGLAS B. COMER

*Attesting Officer*      Acting Commissioner of Patents and Trademarks